United States Patent
Tatsuta

(10) Patent No.: US 10,120,419 B2
(45) Date of Patent: Nov. 6, 2018

(54) WEARABLE DEVICE

(71) Applicant: OLYMPUS CORPORATION, Tokyo (JP)

(72) Inventor: Seiji Tatsuta, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 29 days.

(21) Appl. No.: 15/380,588

(22) Filed: Dec. 15, 2016

(65) Prior Publication Data

US 2017/0185109 A1    Jun. 29, 2017

(30) Foreign Application Priority Data

Dec. 24, 2015  (JP) .................................. 2015-250842

(51) Int. Cl.
*G06F 1/16*      (2006.01)
*G06F 3/0362*    (2013.01)

(52) U.S. Cl.
CPC ............ *G06F 1/1675* (2013.01); *G06F 1/163* (2013.01); *G06F 1/1639* (2013.01); *G06F 3/0362* (2013.01)

(58) Field of Classification Search
None
See application file for complete search history.

(56) References Cited

U.S. PATENT DOCUMENTS

| | | | |
|---|---|---|---|
| 6,680,802 B1 | 1/2004 | Ichikawa et al. | |
| 6,771,424 B1 | 8/2004 | Amafuji et al. | |
| 7,719,769 B2 | 5/2010 | Sugihara et al. | |
| 8,577,427 B2* | 11/2013 | Serota | G02B 27/017 345/8 |
| 9,298,011 B2* | 3/2016 | Pombo | G02B 27/0176 |
| 9,417,660 B2* | 8/2016 | Pombo | G02B 27/0149 |
| 2004/0252077 A1 | 12/2004 | Terasaki | |
| 2010/0188314 A1* | 7/2010 | Miyake | G02B 27/0176 345/8 |
| 2011/0012814 A1* | 1/2011 | Tanaka | G02B 27/0176 345/8 |

(Continued)

FOREIGN PATENT DOCUMENTS

| | | |
|---|---|---|
| JP | 2001-75496 A | 3/2001 |
| JP | 2001-108935 A | 4/2001 |

(Continued)

OTHER PUBLICATIONS

U.S. Appl. No. 15/278,137, filed Sep. 28, 2016.

(Continued)

*Primary Examiner* — Xanthia C Cunningham
(74) *Attorney, Agent, or Firm* — Scully, Scott, Murphy & Presser, P.C.

(57) ABSTRACT

A wearable device includes a wearable element that is worn on the head of the wearer, a display that displays a virtual image within part of the field of view of the wearer, and a connector that is connected to the wearable element. The connector includes a slide-rotation mechanism that supports the display so as to be slidable with respect to the head and rotatable in a state in which the display has been slid. The slide-rotation mechanism is provided to the connector so that the slide direction of the display is parallel to the direction that extends along the rotation axis around which the display is rotated.

15 Claims, 13 Drawing Sheets

(56) References Cited

U.S. PATENT DOCUMENTS

| | | | |
|---|---|---|---|
| 2012/0081658 A1* | 4/2012 | Sugihara | G02B 27/0176 351/158 |
| 2013/0188080 A1* | 7/2013 | Olsson | G09G 5/00 348/333.01 |
| 2013/0249776 A1* | 9/2013 | Olsson | G06F 1/163 345/8 |
| 2014/0043214 A1* | 2/2014 | Park | G06F 1/163 345/8 |
| 2014/0204021 A1 | 7/2014 | Sugihara et al. | |
| 2016/0062457 A1* | 3/2016 | Kobayashi | G06F 3/013 345/156 |
| 2016/0216519 A1* | 7/2016 | Park | G02B 27/0176 |

FOREIGN PATENT DOCUMENTS

| | | |
|---|---|---|
| JP | 2003-46903 A | 2/2003 |
| JP | 2004-236242 A | 8/2004 |
| JP | 2006-3879 A | 1/2006 |
| JP | 2010-287004 A | 12/2010 |
| JP | 2014-137522 A | 7/2014 |

OTHER PUBLICATIONS

Office Action dated Aug. 4, 2017 received in U.S. Appl. No. 15/278,137.
Office Action dated Nov. 20, 2017 received in U.S. Appl. No. 15/278,137.

* cited by examiner

WEARABLE DEVICE

Japanese Patent Application No. 2015-250842 filed on Dec. 24, 2015, is hereby incorporated by reference in its entirety.

BACKGROUND

The present invention relates to a wearable device and the like.

A wearable device (head-mounted display) that is worn on the head of the user and projects an image within the field of view of the user is known. For example, JP-A-2010-287004, JP-A-2001-75496, and JP-A-2006-3879 disclose technology relating to such a wearable device.

JP-A-2010-287004 discloses a head-mounted image display device having a configuration in which an arm is secured on a headphone-type main body, and a display is secured on the arm, wherein the arm is rotated around a first axis with respect to the main body, and the display is rotated around a second axis and a third axis with respect to the arm. The first to third axes are orthogonal to each other, and the display is connected to the main body so as to be rotatable around each axis with respect to the main body. JP-A-2001-75496 discloses a head-mounted display device having a configuration in which a head-mounted holder is provided with a holding guide to which a display unit is slidably attached, and can be used in an inverted state when the display unit is attached to the holding guide in an inverted state.

JP-A-2006-3879 discloses a pupil-division see-through-type head-mounted display. The technology disclosed in JP-A-2006-3879 significantly reduces the size of an eyepiece element (eyepiece window) that projects (emits) a virtual image of a display image to implement see-through display (i.e., display in which the external field of view and the display image overlap each other), and see-around display (i.e., display in which a wide external field of view is provided).

SUMMARY

According to one aspect of the invention, there is provided a wearable device comprising:

a wearable element that is worn on a head of a wearer;

a display that displays a virtual image within part of a field of view of the wearer; and a connector that is connected to the wearable element, and comprises a slide-rotation mechanism that supports the display so as to be slidable with respect to the head and rotatable in a state in which the display has been slid, wherein the slide-rotation mechanism is provided to the connector so that a slide direction of the display is parallel to a direction that extends along a rotation axis around which the display is rotated.

DESCRIPTION OF EXEMPLARY EMBODIMENTS

Several aspects of the invention may provide a wearable device that makes it possible to separately perform a positional adjustment of an eyepiece in the direction along the width of the eye (human eye), and an adjustment that adjusts the image display position within the field of view, and allows the user to arbitrarily change the image display position without performing a readjustment in the direction along the width of the eye.

Since the wearable device includes the slide-rotation mechanism that supports the display so as to be slidable with respect to the head and rotatable in a state in which the display has been slid, it is possible to slide the eyepiece of the display to a position at which the display screen can be observed with one eye corresponding to the width of the eye of the user (first-step operation). It is possible to place the eyepiece in an optimum area within the field of view, or cause the optical axis of the eyepiece to coincide with the line of sight of the user, by optionally performing the second-step operation. Therefore, the user can observe the entire image. Since the second-step operation effects a rotation at the slide position determined by the first-step operation, it is possible to effect a rotation without causing a shift in the slide direction, and optionally perform only the second-step operation after the first-step operation has been performed.

The exemplary embodiments of the invention are described below. Note that the following exemplary embodiments do not in any way limit the scope of the invention laid out in the claims. Note also that all of the elements described below in connection with the exemplary embodiments should not necessarily be taken as essential elements of the invention.

1. Configuration

Figure 1:
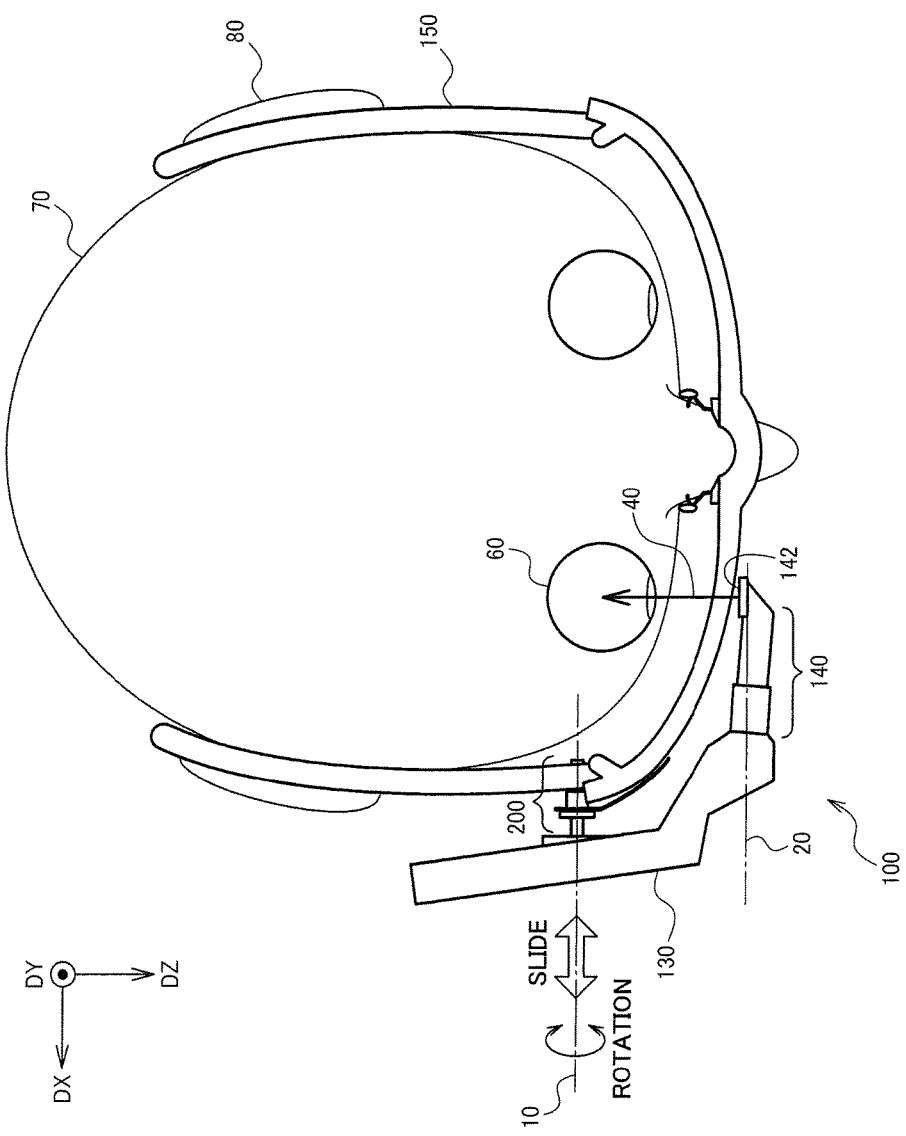
FIG. 1 is a top view illustrating a configuration example of a wearable device.
Figure 2A:
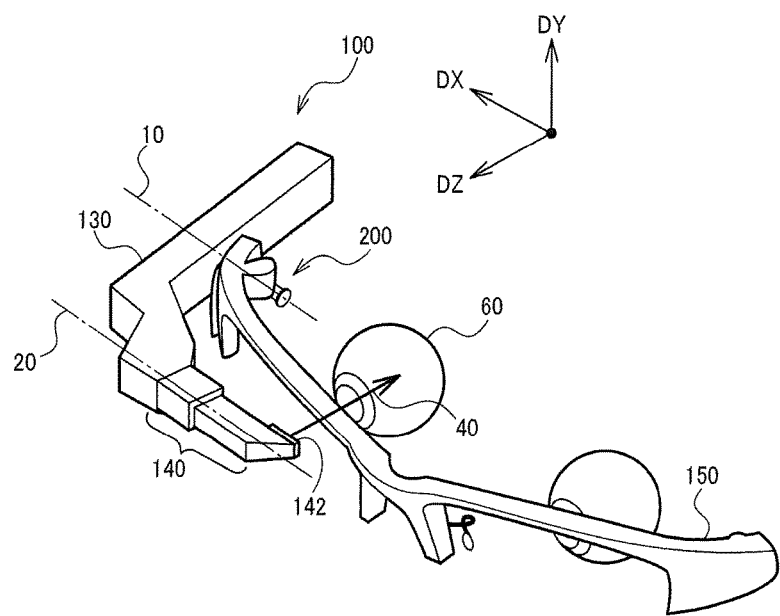
FIG. 2A is a perspective view illustrating a configuration example of a wearable device.
Figure 2B:
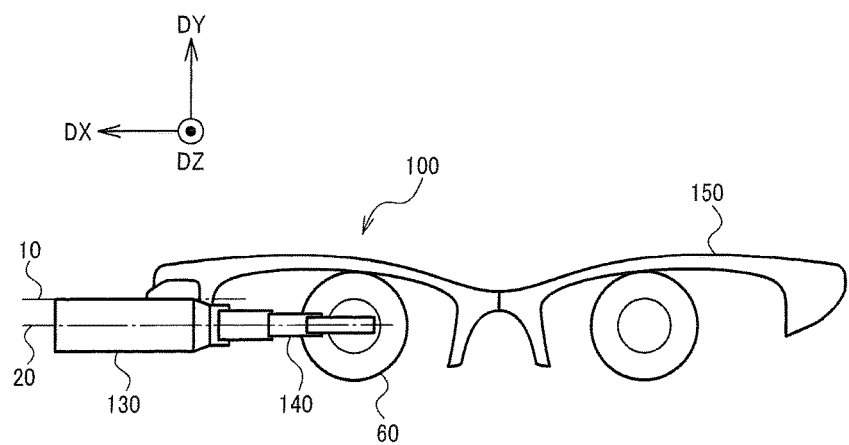
FIG. 2B is a front view illustrating a configuration example of a wearable device.

FIGS. 1 to 2B illustrate a configuration example of a wearable device 100 according to one embodiment of the invention. FIG. 1 is a top view illustrating the wearable device 100 (viewed perpendicularly to the top of the head)

that is worn on a head 70, FIG. 2A is a perspective view illustrating the wearable device 100 (viewed obliquely from the upper right side with respect to the front of the face), and FIG. 2B is a front view illustrating the wearable device 100 (viewed from the front side). Note that the head 70 and a temple of an eyeglass-type frame 150 are omitted in FIGS. 2A and 2B. The directions DX, DY, and DZ are respectively the rightward direction, the upward direction, and the forward direction with respect to the head 70, and are orthogonal to each other. When the wearer stands upright, the direction DY is a direction that extends vertically upward, and the directions DX and DZ are directions that extend horizontally.

The wearable device 100 (head-mounted display) includes a wearable element (frame or band) that is worn on the head 70 of the wearer (user), a display 140 (display device) that displays a virtual image within part of the field of view of the wearer, and a connector 130 (connection member) that is connected to the wearable element. The connector 130 includes a slide-rotation mechanism 200 that supports the display 140 so as to be slidable with respect to the head 70 and rotatable in a state in which the display 140 has been slid. The slide-rotation mechanism 200 is provided to the connector 130 so that the slide direction of the display 140 is parallel to the direction that extends along a rotation axis 10 around which the display 140 is rotated.

In the configuration example illustrated in FIGS. 1 to 2B, the wearable element is the eyeglass-type frame 150, and includes the temple and a front, the temple being used to secure the eyeglass-type frame 150 on an ear 80. The front includes two rims (lens frames), a bridge that connects the two rims, and a nose pad that is used to secure the front on the nose, for example. Note that the wearable element is not limited to the eyeglass-type frame 150. It suffices that the wearable element be designed so that the wearable device 100 can be secured on the head 70. For example, the wearable element may be a neck band, or may be a head band.

The connector 130 is an element that connects the wearable element and the display 140. The connector 130 supports the display 140 (eyepiece window 142) in front of an eyeball 60 and the front of the eyeglass-type frame 150. The connector 130 and the wearable element are connected through the slide-rotation mechanism 200. The slide-rotation mechanism 200 is implemented by a rotation mechanism such as a shaft (shaft protrusion) and a bearing. In this case, the shaft is slidable along the rotation axis 10 with respect to the bearing. The slide-rotation mechanism 200 makes it possible to implement a rotation around the rotation axis 10 (i.e., a rotation in both directions (clockwise direction and counterclockwise direction)) and a slide along the rotation axis 10.

The display 140 and the connector 130 are connected through a rotation mechanism (e.g., shaft (shaft protrusion) and bearing), and a rotation around a rotation axis 20 (second rotation axis) is implemented by means of the rotation mechanism. An adjustment that causes an eyepiece optical axis 40 of the display 140 to coincide with the line of sight can be simplified by rotating the display 140 around the rotation axis 20 (as described later).

The connector 130 is implemented by a rod-like or plate-like member (that may be curved or bent, and may have a non-uniform thickness), for example. A substrate, a battery, and the like may be provided inside the connector 130. The rod-like or plate-like member is connected to the display 140 at a first end (i.e., one end), and is connected to the wearable element at a position between the first end and a second end (i.e., the other end). Alternatively, the first end of the rod-like or plate-like member may be connected to the display 140, and the second end of the rod-like or plate-like member may be connected to the wearable element. Note that the shape and the connection position of the connector 130 are not limited to the examples described above.

The display 140 is configured to guide light (image) output from a display device to the eyepiece window 142 through an optical system, and emit the guided light from the eyepiece window 142 toward the pupil of the eyeball 60 (i.e., emit the guided light in the direction along the line of sight of the eyeball 60 (visual axis direction)) to display an enlarged virtual image of the image within the field of view (i.e., project the image onto the retina). The display device may be implemented by a liquid crystal display device, a self-emitting display device (e.g., EL display device), or a scanning-type display device that scans the retina with spot light, for example. Note that the term "line of sight" used herein refers to a line that connects the eyeball 60 and the viewing target object, or refers to the viewing direction of the eyeball 60. More specifically, the term "line of sight" used herein refers to a line that extends along the optical axis of the eyeball 60 when the viewing target object is being viewed, or refers to a direction that extends along the optical axis. The term "visual axis" used herein refers to the optical axis of the eyeball 60.

According to one embodiment of the invention, the slide-rotation mechanism 200 supports the display 140 so as to be slidable with respect to the head 70 and rotatable around the rotation axis 10 that is (approximately) parallel to the direction that extends along the slide direction. The term "slide" used herein refers to moving an object with respect to another object in a sliding manner. For example, the term "slide" used herein in connection with one embodiment of the invention refers to moving a slide shaft with respect to a holder (that holds the slide shaft) in a sliding manner. Note that the slide movement is not limited to a smooth slide movement, but also includes a stepwise slide movement that is implemented using a latch mechanism or the like.

The slide direction and the rotation axis 10 need not necessarily be precisely parallel to each other, and may be approximately parallel to each other. For example, when a structure that slides a shaft with respect to a bearing is used, the rotation axis and the slide direction may have an error corresponding to the tolerance when the structure is produced. When a backlash is provided to the engagement between the shaft and the bearing, the direction of the rotation axis may change due to the backlash.

According to one embodiment of the invention, the slide of the display 140 in the direction along the width of the eye and the movement of the display 140 (i.e., the movement of the display position) in the upward-downward direction can be implemented independently of each other. Specifically, since the slide direction and the rotation axis 10 are parallel to each other, the moving direction of the display 140 due to rotation forms a right angle (approximately) with the slide direction, and the display 140 does not move in the direction along the width of the eye even when the display 140 is rotated. It is also possible to slide the display 140 in the direction along the width of the eye without changing the position of the display 140 in the upward-downward direction.

More specifically, the slide direction of the display 140 is a direction that extends along the eyes of the wearer when the wearable element is worn on the head 70. The slide-rotation mechanism 200 is configured so that the wearer can slide the display 140 to a position at which the wearer can observe the display screen of the display 140 with one eye (eyeball 60), and then change the position of the display image within the field of view of the wearer by rotating the display 140.

Specifically, when the user has worn the wearable device 100 for the first time, the wearer (user) performs an adjustment in the direction along the width of the eye by sliding the slide-rotation mechanism 200 (first operation), and then adjusts the position of the display image by rotating the connector 130 around the rotation axis 10 (second operation). The wearer can then cause the eyepiece optical axis 40 of the display 140 to coincide with the line of sight of the wearer by rotating the display 140 around the rotation axis 20 (third operation). According to one embodiment of the invention, since a change in position in the direction along the width of the eye does not occur when the position of the display image is adjusted, it is unnecessary to perform a readjustment (i.e., it is possible to complete the adjustment in the direction along the width of the eye and the adjustment of the display position without repeating the first operation and the second operation). Since a change in position in the direction along the width of the eye does not occur even when the position of the display image is adjusted (changed) again, it is possible to complete the adjustment of the display position by performing only the second operation (and the third operation, if necessary) without performing the first operation. According to one embodiment of the invention, the adjustment operation can thus be simplified.

Note that the direction that extends along the eyes of the wearer refers to a direction that is parallel to a line that connects the eyeball center of the right eye and the eyeball center of the left eye, or refers to a direction that is parallel to a line that connects the center of the pupil of the right eye and the center of the pupil of the left eye when the eyes of the wearer face in the forward direction. In FIGS. 1 to 2B, the direction that extends along the eyes of the wearer corresponds to the direction DX. The slide position refers to the position of the display 140 when the slide-rotation mechanism 200 has been slid along the rotation axis 10, and stopped.

Although an example in which the slide-rotation mechanism 200 is provided between the connector 130 and the wearable element (eyeglass-type frame 150), and is rotated around the first rotation axis 10 and slid along the first rotation axis 10, has been described above, the position at which the slide-rotation mechanism 200 is provided is not limited thereto.

For example, the slide-rotation mechanism 200 may be provided between the connector 130 and the display 140, and may be rotated around the second rotation axis 20 and slid along the second rotation axis 20. In this case, the slide-rotation mechanism 200 is configured so that the wearer can slide the display 140 to a position at which the wearer can observe the display screen of the display 140 with one eye (eyeball 60), and then rotate the display 140 to a position at which the eyepiece optical axis 40 of the display 140 coincides with the line of sight of the wearer. Specifically, when the user has worn the wearable device 100 for the first time, the wearer (user) can perform an adjustment in the direction along the width of the eye by sliding the slide-rotation mechanism 200 (first operation), and then cause the eyepiece optical axis 40 of the display 140 to coincide with the line of sight of the wearer by rotating the display 140 around the rotation axis 20 (second operation). The wearer can also adjust the position of the display image by rotating the connector 130 around the rotation axis 10 (third operation) between the first operation and the second operation. In this case, since a change in position in the direction along the width of the eye does not occur when the eyepiece optical axis 40 is caused to coincide with the line of sight of the wearer, it is also possible to simplify the adjustment operation.

FIGS. 1 to 2A illustrate an example in which the first rotation axis 10 passes through the center of the eyeball 60 (or a position near the center of the eyeball 60), the second rotation axis 20 passes through the eyepiece window 142 of the display 140 (or a position near the eyepiece window 142 of the display 140), and the first rotation axis 10 and the second rotation axis 20 are parallel to each other. In this case, it is possible to independently perform an adjustment of the display position using the first rotation axis 10, and an adjustment that causes the eyepiece optical axis 40 to coincide with the line of sight using the second rotation axis 20 (as described later). Note that the configuration of the rotation axes is not limited thereto.

For example, the first rotation axis 10 may be an axis that does not pass through the center of the eyeball 60 (or a position near the center of the eyeball 60), and the second rotation axis 20 may be an axis that does not pass through the eyepiece window 142 of the display 140 (or a position near the eyepiece window 142 of the display 140). Alternatively, only one rotation axis may be provided so as not to pass through the eyeball center (or a position around the eyeball center) or the eyepiece window 142 (or a position around the eyepiece window 142). In such a case, an adjustment of the display position and an adjustment that causes the eyepiece optical axis 40 to coincide with the line of sight are not clearly distinguished from each other. However, since a positional adjustment in the direction along the width of the eye using a slide operation and an adjustment using a rotation operation are independently performed as described above, it is also possible to simplify the adjustment operation.

2. Detailed Configuration of Slide-rotation Mechanism

The details of the slide-rotation mechanism 200 are described below. First to third detailed configuration examples are described below as examples in which both the slide operation and the rotation operation are performed using a slide shaft and a holder with which the slide shaft engages.

Figure 3A:
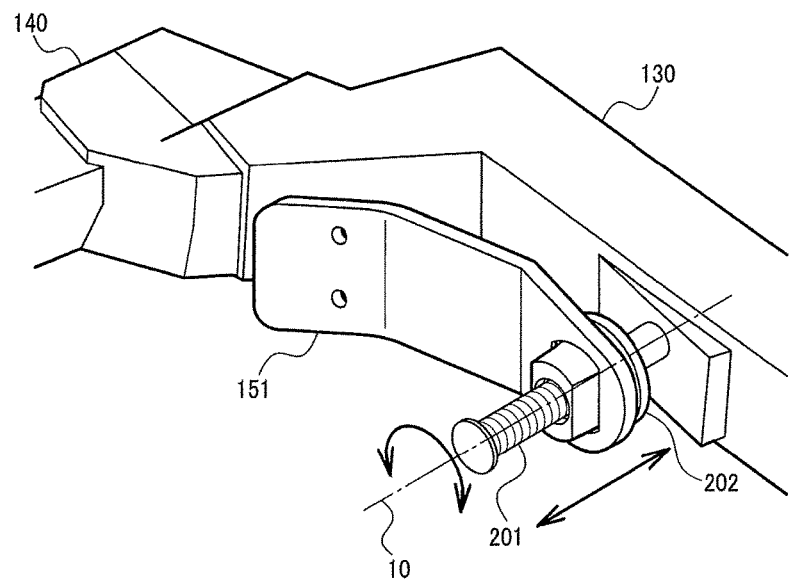
FIGS. 3A and 3B illustrate a first detailed configuration example of a slide-rotation mechanism.
Figure 3B:
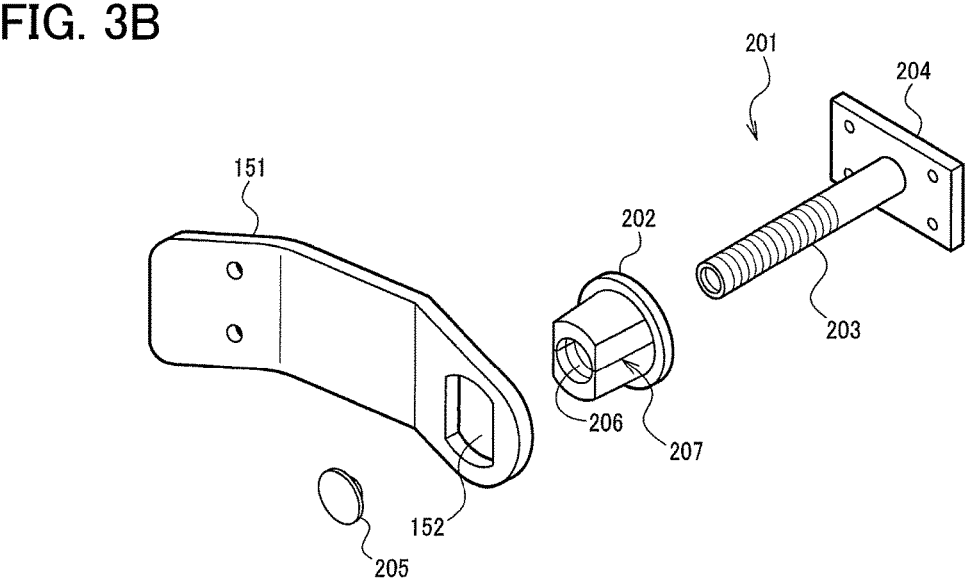

FIGS. 3A and 3B illustrate the first detailed configuration example of the slide-rotation mechanism 200. The slide-rotation mechanism 200 includes a rod-like slide shaft 201 (slide shaft member) that is secured on the connector 130, and a holder 202 (holding member) that is secured on the wearable element, and holds the slide shaft 201 so as to be slidable and rotatable. The center axis of the slide shaft 201 coincides with the rotation axis 10.

According to the first detailed configuration example, it is possible to slide the display 140 (connector 130) by moving the slide shaft 201 in the forward-backward direction in a state in which the slide shaft 201 is inserted into (engages with) the through-hole of the holder 202. It is also possible to rotate the display 140 (connector 130) by rotating the slide shaft 201 around the center axis in a state in which the slide shaft 201 is inserted into the through-hole formed in the holder 202.

More specifically, the slide shaft 201 includes a cylindrical member 203 of which the cylinder axis extends parallel to the slide direction (i.e., the direction along the rotation axis 10). The holder 202 is an elastic member having a cylindrical hole 206 into which the cylindrical member 203 is inserted.

The slide shaft 201 may further include a pedestal 204. In this case, one end of the cylindrical member 203 is secured on (or integrally formed with) the pedestal 204, and the pedestal 204 is secured on the connector 130. The slide shaft 201 may further include a stopper 205. In this case, the stopper 205 is fitted to the other end of the cylindrical member 203 after the cylindrical member 203 has been inserted into the cylindrical hole 206 of the holder 202 so as to prevent removal of the cylindrical member 203. The holder 202 is inserted into a hole 152 of a member 151. The member 151 is a long plate-like member that is bent. One end of the member 151 is secured on the wearable element (eyeglass-type frame 150), and the hole 152 is formed on the other end of the member 151.

According to the first detailed configuration example, since the holder 202 is formed by an elastic member, it is possible to implement a slide and a rotation using a latch mechanism (as described later). Specifically, the movement of the latch mechanism can be implemented through deformation of the elastic member. When the latch mechanism is set to an engagement state, the elastic member maintains the engagement state, and the cylindrical member 203 can be rotated.

More specifically, a protrusion is formed on the curved surface (side surface) of the cylindrical member 203. A plurality of grooves are formed in the curved surface (inner surface or wall surface) of the cylindrical hole 206. Each of the plurality of grooves is formed along the circumferential direction.

In FIG. 3B, a plurality of protrusions are formed on the curved surface of the cylindrical member 203. The plurality of protrusions are formed along the circumferential direction of the cylinder, and are arranged side by side in the slide direction. The circumference of the cylinder is formed by a line of intersection of a plane perpendicular to the axis (rotational symmetry axis) of the cylinder and the curved surface of the cylinder. The plurality of protrusions are fitted into (engage with) the plurality of grooves of the cylindrical hole 206, so that the slide shaft 201 engages with the holder 202.

When the slide shaft 201 is slid with respect to the holder 202, each protrusion that has engaged with one of the grooves engages with another groove. A cut 207 is formed in the holder 202. Since the holder 202 is formed by an elastic member, the holder 202 can be divided along the cut 207. When the slide shaft 201 is slid with respect to the holder 202, the holder 202 is temporarily divided along the cut 207 so that each protrusion that has engaged with one of the grooves can engage with another groove. When the slide shaft 201 is rotated with respect to the holder 202, each protrusion that has engaged with one of the grooves when the slide shaft 201 was slid with respect to the holder 202 is rotated along the corresponding groove. Since the engagement state is maintained due to the elasticity of the elastic member, movement of the slide shaft 201 in the slide direction does not occur (or occurs to only a small extent) (i.e., the slide operation and the rotation operation can be performed independently of each other). The slide-rotation mechanism 200 that makes it possible to separately perform the slide operation and the rotation operation can thus be implemented.

Although FIGS. 3A and 3B illustrate an example in which the slide-rotation mechanism 200 is provided between the connector 130 and the wearable element, the slide-rotation mechanism 200 that is configured in the same manner as described above may be provided between the connector 130 and the display 140. More specifically, the slide-rotation mechanism 200 may include a rod-like slide shaft that is secured on the display 140, and a holder that is secured on the connector 130, and holds the slide shaft so as to be slidable and rotatable. According to this configuration, the slide-rotation mechanism 200 that makes it possible to separately perform the slide operation and the rotation operation can also be implemented.

Figure 4A:
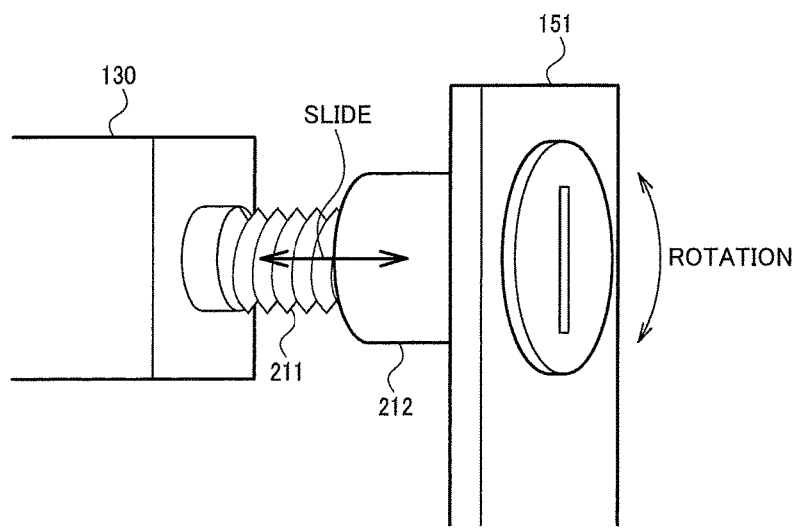
FIGS. 4A and 4B illustrate a second detailed configuration example of a slide-rotation mechanism.
Figure 4B:
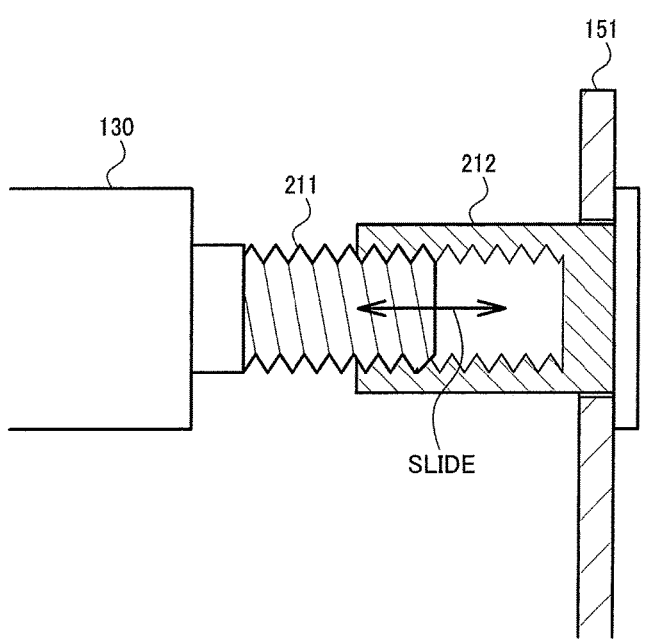

FIGS. 4A and 4B illustrate the second detailed configuration example of the slide-rotation mechanism 200. The slide-rotation mechanism 200 includes a rod-like slide shaft 211 (slide shaft member) that is secured on the connector 130, and a holder 212 (holding member) that is secured on the wearable element, and holds the slide shaft 211 so as to be slidable and rotatable. In the second detailed configuration example, the slide shaft 211 is a male screw member (male screw) of which the rotation axis extends parallel to the slide direction. The holder 212 is a female screw member (female screw) that engages with the male screw member. The slide shaft 211 can be rotated and slid with respect to the holder 212 by turning the male screw member or the female screw member in a state in which the male screw member engages with the female screw member.

In the example illustrated in FIGS. 4A and 4B, one end of the male screw member (slide shaft 211) is secured on the connector 130, and the other end of the male screw member is inserted into the threaded hole of the female screw member. One end of the female screw member (holder 212) is fitted into (engages with) a hole formed on one end of the member 151 (i.e., a member secured on the wearable element), and a threaded hole opens at the other end of the female screw member. The holder 212 can be rotated with respect to the member 151 along the screw rotation axis, and the display 140 (connector 130) can be slid by rotating the holder 212. The display position can be changed by rotating the connector 130. When the slide shaft 211 is rotated in a state in which the holder 212 is stationary, a slide occurs to some extent. However, since the movable range of the display position is several degrees, such a slide lies within an allowable range. When the frictional force between the screws is set to be higher than the frictional force between the member 151 and the holder 212, the holder 212 can be rotated with respect to the member 151 by rotating the connector 130. In this case, a slide does not occur (i.e., the slide operation and the rotation operation can be performed independently of each other).

Note that the slide-rotation mechanism 200 may be provided between the connector 130 and the display 140 in the same manner as described above in connection with the first detailed configuration example. In this case, one end of the male screw member (slide shaft 211) is secured on the display 140, and the other end of the male screw member is inserted into the threaded hole of the female screw member. One end of the female screw member (holder 212) is secured on the connector 130, and a threaded hole opens at the other end of the female screw member.

Figure 5A:
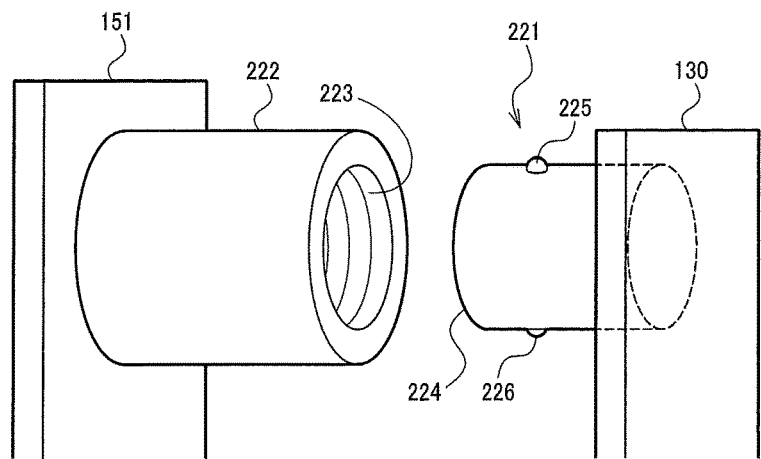
FIGS. 5A and 5B illustrate a third detailed configuration example of a slide-rotation mechanism.
Figure 5B:
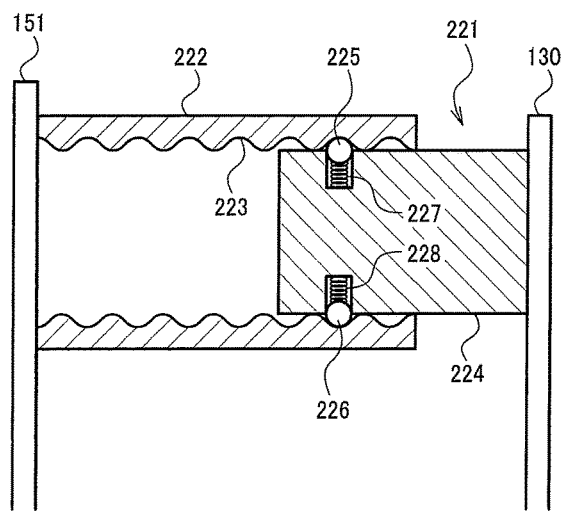

FIGS. 5A and 5B illustrate the third detailed configuration example of the slide-rotation mechanism 200. The slide-rotation mechanism 200 includes a rod-like slide shaft 221 (slide shaft member) that is secured on the connector 130, and a holder 222 (holding member) that is secured on the wearable element, and holds the slide shaft 221 so as to be slidable and rotatable. In the third detailed configuration example, the slide shaft 221 includes a cylindrical member 224 of which the cylinder axis extends parallel to the slide direction, and ball members 225 and 226 that are connected to the cylindrical member 224 through springs 227 and 228.

The holder 222 is a member (cylindrical member) having a cylindrical hole into which the cylindrical member 224 is inserted.

The cylindrical member 224 is provided with two holes that are formed from the side surface (curved surface) of the cylinder toward the cylinder axis. The two holes are formed at symmetrical positions (opposite positions) with respect to the cylinder axis, for example. One end of the spring (227, 228) is secured on the bottom of each hole, and the ball member (225, 226) (ball) is secured on the other end of the spring (227, 228). At least part of the ball member (225, 226) protrudes from the side surface of the cylinder when no force is applied to the spring (227, 228) (i.e., when the spring (227, 228) has a natural length). One end of the cylindrical member 224 is secured on the connector 130, and the other end of the cylindrical member 224 is inserted into the cylindrical hole of the holder 202.

A plurality of grooves 223 that are arranged in the slide direction are formed in the curved surface (wall surface or inner wall) of the cylindrical hole of the holder 222. Each groove 223 is formed along the circumferential direction of the cylinder. One end of the holder 222 is secured on the member 151, and the cylindrical hole opens at the other end of the holder 222. When the cylindrical member 224 has been inserted into the cylindrical hole, the ball members 225 and 226 are depressed into the cylindrical member 224 by the protrusion (i.e., an area between the grooves) formed within the cylindrical hole. The springs 227 and 228 expand when the ball members 225 and 226 have been fitted into the groove formed within the cylindrical hole so that the ball members 225 and 226 are pressed against the groove. When the connector 130 (display 140) is rotated in this state, the ball members 225 and 226 move along the groove, and the connector 130 is rotated with respect to the wearable element. Since the engagement state (i.e., engagement between the ball members 225 and 226 and the groove) is maintained by the springs 227 and 228, the movement of the slide shaft 221 in the slide direction does not occur (or occurs to only a small extent) (i.e., the slide operation and the rotation operation can be performed independently of each other).

Note that the slide-rotation mechanism 200 may be provided between the connector 130 and the display 140 in the same manner as described above in connection with the first and second detailed configuration examples. In this case, one end of the cylindrical member 224 of the slide shaft 221 is secured on the display 140, and the other end of the cylindrical member 224 is inserted into the cylindrical hole of the holder 222. One end of the holder 222 is secured on the connector 130, and the cylindrical hole opens at the other end of the holder 222.

In the first to third detailed configuration examples, the relationship "Fs>Fr" is satisfied (where, Fs is a force (holding force or slide holding force) required when sliding the slide shaft (201, 211, 221) with respect to the holder (202, 212, 222), and Fr is a force (holding force or rotation holding force) required when rotating the slide shaft with respect to the holder).

When the relationship "Fs>Fr" is satisfied, movement in the slide direction is suppressed when a rotational adjustment (i.e., an adjustment of the image display position, or an adjustment that causes the optical axis to coincide with the line of sight) is performed, and a readjustment in the direction along the width of the eye can be made unnecessary. Therefore, it suffices for the user to perform only a rotational adjustment after performing an adjustment in the direction along the width of the eye. This makes it possible to simplify the adjustment operation.

Note that the term "holding force" used herein refers to a force required to implement a slide (i.e., the minimum force that must be applied to implement a slide) and a force required to implement a rotation (i.e., the minimum force that must be applied to implement a rotation). When the members are held by means of friction, the holding force corresponds to the frictional force. It is considered that the holding force may change depending on the position at which the force is applied to the wearable device. Note that the relationship "Fs>Fr" is satisfied at a position at which the rotation operation is normally performed. For example, when using the configuration illustrated in FIG. 1, it is considered that the user (wearer) performs the rotation operation while holding the connector 130 or the display 140 with the fingers. In this case, the relationship "Fs>Fr" is satisfied when the force Fr required to implement a rotation is compared with the force Fs at which a slide (unintentionally) occurs. For example, the maximum force is required to implement a rotation when the user (wearer) holds part of the connector 130 situated close to the rotation axis 10 (since the torque decreases). The relationship "Fs>Fr" is satisfied when the maximum force is required to implement a rotation. Each force can be adjusted by adjusting the hardness (elasticity) of the elastic member used as the holder 202, the depth of the grooves provided to the holder 202, the height of the protrusions provided to the slide shaft 201, and the like (see FIGS. 3A and 3B), for example.

Although the first to third detailed configuration examples of the slide-rotation mechanism 200 when both the slide operation and the rotation operation are performed using the slide shaft and the holder with which the slide shaft engages, have been described above, the configuration of the slide-rotation mechanism 200 is not limited to the first to third detailed configuration examples. For example, the slide shaft may be formed by a cylindrical member, the holder may be formed by a member having a cylindrical hole, and the surface of the cylindrical member (i.e., the curved surface of the cylinder) and the inner surface of the cylindrical hole (i.e., the curved surface of the cylinder) may be subjected to a surface treatment so that the relationship "Fs>Fr" is satisfied. For example, the surface of the cylindrical member and the inner surface of the cylindrical hole may be formed of a metal, and fine anisotropic scratches may be formed on the surface of the cylindrical member and the inner surface of the cylindrical hole that are formed of a metal. The anisotropic scratches provide the frictional force with anisotropy. Specifically, the surface treatment is performed so that the frictional force in the slide direction is higher than the frictional force in the rotation direction.

A fourth detailed configuration example of the slide-rotation mechanism 200 is described below as a configuration example when a slide operation is performed using a slide shaft and a shaft holder with which the slide shaft engages, and the rotation operation is performed using the shaft holder and a rotation holder with which the shaft holder engages.

Figure 6A:
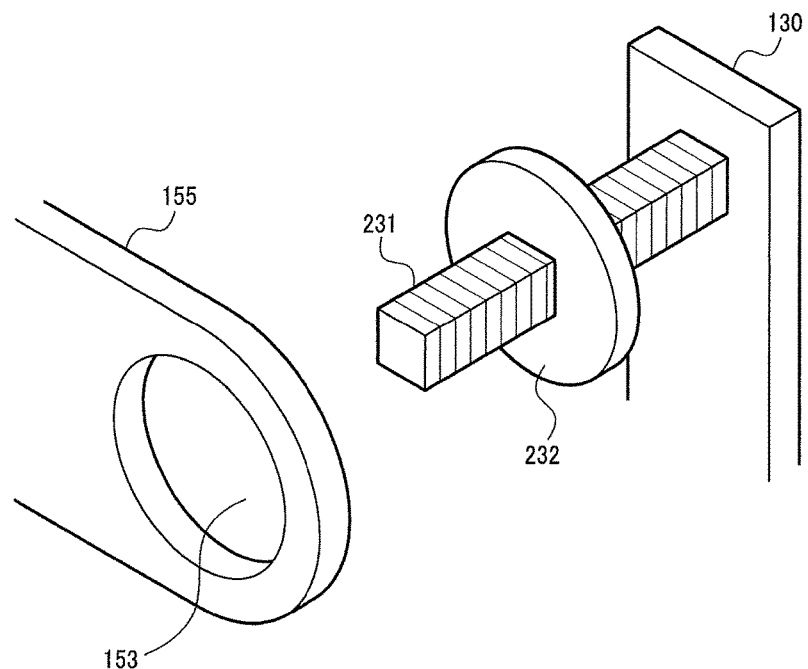
FIGS. 6A and 6B illustrate a fourth detailed configuration example of a slide-rotation mechanism.
Figure 6B:
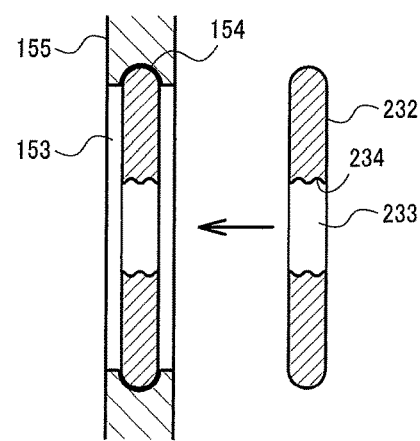

FIGS. 6A and 6B illustrate the fourth detailed configuration example of the slide-rotation mechanism 200. The slide-rotation mechanism 200 includes a rod-like slide shaft 231 (slide shaft member) that is secured on the connector 130, a shaft holder 232 (first holder or first holding member) that holds the slide shaft 231 so as to be slidable, and a rotation holder 155 (second holder or second holding member) that is provided to the wearable element, and holds the shaft holder 232 so as to be rotatable.

The slide shaft 231 engages with the shaft holder 232 so as to be slidable (in the longitudinal direction of the slide shaft 231) and non-rotatable. Specifically, the slide shaft 231 can be slid with respect to the shaft holder 232 in the rotation axis direction (i.e., the longitudinal direction of the slide shaft 231), but cannot be rotated with respect to the shaft holder 232. The shaft holder 232 engages with the rotation holder 155 so as to be rotatable and non-slidable. Specifically, the shaft holder 232 can be rotated with respect to the rotation holder 155 around the rotation axis, but cannot be slid with respect to the rotation holder 155. The slide-rotation mechanism 200 can thus be implemented so that the slide operation and the rotation operation are performed using different elements.

More specifically, the slide shaft 231 is a columnar member of which the longitudinal direction is parallel to the slide direction. The cross section of the columnar member that is orthogonal to the longitudinal direction has a non-circular outer circumferential shape. Specifically, the columnar member is designed to have such a shape that the columnar member cannot be rotated around an axis that is parallel to the longitudinal direction of the columnar member when the columnar member is inserted into a hole (that has the same shape as the cross-sectional shape of the columnar member) formed in the shaft holder 232. For example, the columnar member is formed in the shape of a quadrangular prism (see FIG. 6A). Alternatively, the columnar member may be formed in the shape of a polygonal prism other than a quadrangular prism of which the cross section has three or more corners. In this case, the cross section of the polygonal prism need not necessarily have only corners having an interior angle of less than 180°, but may have a corner having an interior angle of more than 180°. For example, the columnar member may have a cross-like cross-sectional shape. Alternatively, the columnar member may have a cross-sectional shape in which part of a circle is linearly removed (e.g., semicircular cross-sectional shape). The columnar member may have a cross-sectional shape in which a plurality of corners are connected through a curved line (e.g., a cross-sectional shape in which three corners are connected through an arc). The columnar member may have a cross-sectional shape in which a circle has a protrusion or a recess. Note that the columnar member need not necessarily have a cross-sectional shape of which each corner is the intersection of straight lines, but may have a cross-sectional shape having a rounded corner. The shaft holder 232 is a circular member having a hole 233 into which the columnar member is inserted. The hole 233 has the same shape as the cross-sectional shape of the columnar member. The circular member is a disc-like member having a circular outer circumferential shape. The disc (disc-like member) need not necessarily have a uniform thickness. For example, the disc (disc-like member) may have a shape in which the center area is thicker than the outer circumferential area. The rotation holder 155 is a member having a circular hole 153 with which the circular member engages. Specifically, the rotation holder 155 is a plate-like member (e.g., a plate-like member having a shape similar to that of the member 151). One end of the rotation holder 155 is secured on the wearable element, and the circular hole 153 is formed at the other end of the rotation holder 155.

More specifically, a plurality of protrusions that are arranged along the slide direction are formed on the side surface of the columnar member that forms the slide shaft 231. Each protrusion is formed along a line of intersection of the cross section of the columnar member that is orthogonal to the longitudinal direction, and the side surface of the columnar member. A groove 234 is formed in the inner surface (inner wall, wall surface, or inner circumferential surface) of the hole 233 of the shaft holder 232. The groove 234 is formed along a line of intersection of a plane that is orthogonal to the slide direction (i.e., the longitudinal direction of the columnar member in a state in which the columnar member is inserted), and the inner surface of the hole 233. One or more (preferably a plurality of) grooves 234 are provided. A groove 154 is formed in the inner surface of the circular hole 153 of the rotation holder 155 along the circumferential direction. When the slide shaft 231 is slid with respect to the shaft holder 232, one protrusion among the plurality of protrusions of the columnar member (slide shaft 231) that has engaged with the groove 234 formed in the inner surface of the hole 233 is removed from the groove 234, and a protrusion among the plurality of protrusions that differs from the one protrusion engages with the groove 234. When the shaft holder 232 is rotated with respect to the rotation holder 155, the outer circumferential surface (circumferential surface or disc side surface) of the circular member (shaft holder 232) is rotated along the groove 154 formed in the inner surface of the circular hole 153. The shaft holder 232 (circular member) is pushed into the groove 154 formed in the inner surface of the circular hole 153, and rotated in a state in which the shaft holder 232 is fitted into the groove 154.

Figure 7:
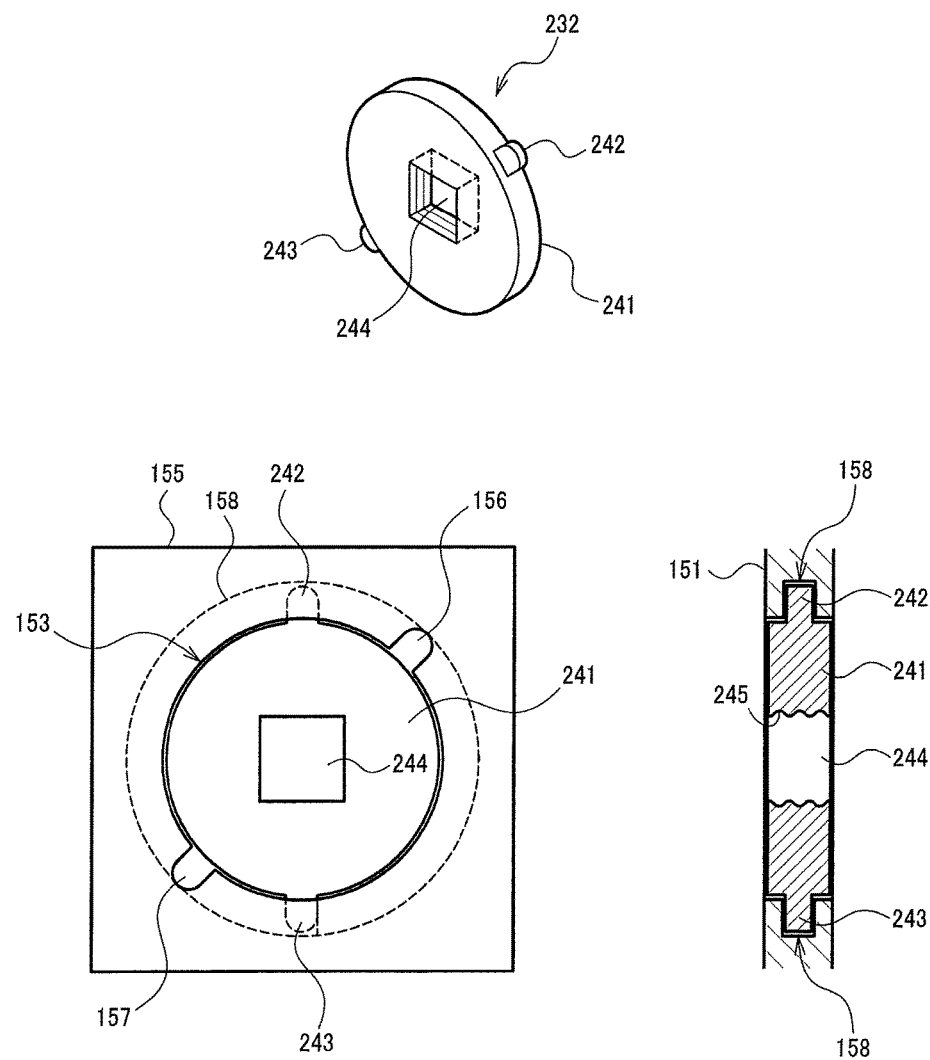
FIG. 7 illustrates a modification of a fourth detailed configuration example of a slide-rotation mechanism.

FIG. 7 illustrates a modification of the engagement mechanism that is configured so that the shaft holder 232 can be rotated with respect to the rotation holder 155, but cannot be slid with respect to the rotation holder 155.

As illustrated in FIG. 7, the shaft holder 232 is a disc-like member having a hole 244 into which the slide shaft 231 (columnar member) is inserted. The disc-like member includes a disc 241 in which the hole 244 is formed at the center, and protrusions 242 and 243 that protrude outward from the disc 241. The circular hole 153 is formed in the rotation holder 155, and has depressions 156 and 157 that are formed to extend outward. A groove 158 is formed in the inner surface of the circular hole 153, and connected to (communicates with) the depressions 156 and 157. When fitting the shaft holder 232 into the rotation holder 155, the shaft holder 232 is pushed into the rotation holder 155 so that the protrusions 242 and 243 are fitted into the depressions 156 and 157, and is rotated so that the protrusions 242 and 243 move along the groove 158. The depressions 156 and 157 are provided so that the protrusions 242 and 243 are situated away from (e.g., form an approximately right angle with) the depressions 156 and 157 when the display 140 is adjusted to a normal image display position.

Note that the slide mechanism that implements a slide of the slide shaft 231 with respect to the shaft holder 232 is configured in the same manner as described above. Specifically, grooves 245 are formed in the inner surface of the hole 244 of the shaft holder 232, and the engagement state between the grooves 245 and the protrusions of the slide shaft 231 changes when the slide shaft 231 is slid with respect to the shaft holder 232.

Note that the slide-rotation mechanism 200 may be provided between the connector 130 and the display 140 in the same manner as described above in connection with the first to third detailed configuration examples. In this case, the slide-rotation mechanism 200 includes the rod-like slide shaft 231 that is secured on the display 140, the shaft holder 232 that holds the slide shaft 231 so as to be slidable, and the rotation holder 155 that is provided to the connector 130, and holds the shaft holder 232 so as to be rotatable.

In the fourth detailed configuration example, the relationship "Fs>Fr" is satisfied (where, Fs is a force (holding force or slide holding force) required when sliding the slide shaft 231 with respect to the shaft holder 232, and Fr is a force (holding force or rotation holding force) required when rotating the shaft holder 232 with respect to the rotation holder 155). The meaning of the frictional force is the same as described above in connection with the first to third detailed configuration examples. According to the fourth detailed configuration example, the adjustment operation is simplified in the same manner as described above in connection with the first to third detailed configuration examples.

According to the first to fourth detailed configuration examples, the slide-rotation mechanism 200 includes the rod-like slide shaft (201, 211, 221, 231) that is secured on the connector 130. The position of the display image within the field of view of the wearer can be changed by rotating the connector 130 and the slide shaft around a given axis (rotation axis (e.g., first rotation axis 10 illustrated in FIG. 1)) of the slide shaft that extends in the longitudinal direction.

Alternatively, the slide-rotation mechanism 200 may include the rod-like slide shaft (201, 211, 221, 231) that is secured on the display 140. In this case, the eyepiece optical axis 40 of the display 140 can be caused to coincide with the line of sight of the wearer by rotating the connector 130 and the slide shaft around a given axis (rotation axis (e.g., second rotation axis 20 illustrated in FIG. 1)) of the slide shaft that extends in the longitudinal direction.

3. Detailed Configuration of Optical System, First Rotation Axis, and Second Rotation Axis The slide-rotation mechanism 200 described above may be applied to a head-mounted display that uses an optical system in which the eyepiece window 142 (viewing window or exit pupil) of the display 140 is very small. When such an optical system is used, the observation state of the display image (i.e., whether or not the entire display image can be observed) changes with high sensitivity due to a shift of the eyepiece optical axis with respect to the line of sight, and a situation in which part of the display image cannot be observed may occur when the display position is changed (see below). According to one embodiment of the invention, this problem can be solved by providing two rotation axes (first rotation axis 10 and second rotation axis 20) at appropriate positions. The slide-rotation mechanism 200 described above may be provided corresponding to either of the two rotation axes (first rotation axis 10 and second rotation axis 20). Since an adjustment in the direction along the width of the eye and an adjustment around each rotation axis can be separately performed by providing the slide-rotation mechanism 200, it suffices to perform only an adjustment around each rotation axis after an adjustment in the direction along the width of the eye has been performed (since a shift in the direction along the width of the eye does not occur).

An optical system that includes a very small eyepiece window 142 and requires a difficult (severe) positional adjustment is described below.

Figure 8:
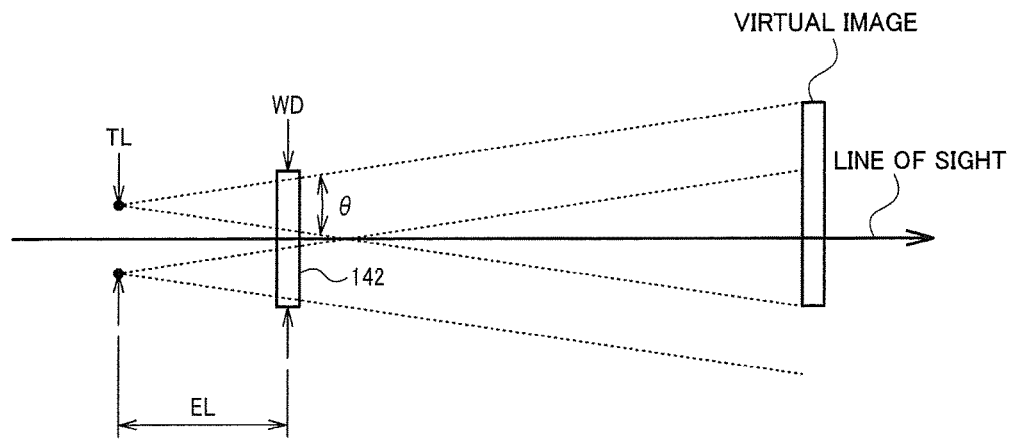
FIG. 8 is a view illustrating an optical system that includes a very small eyepiece window and requires a difficult (severe) positional adjustment.

In the example illustrated in FIG. 8, WD is the effective open width (e.g., the width in the vertical direction) of the eyepiece window 142. TL is the range (pupil position allowable range) within which the entire virtual image (angle of view: $\theta$) can be observed when the eyepiece window 142 is observed from a position at a distance EL (eye relief). Note that the pupil size is not taken into consideration (i.e., only a relationship that is satisfied with an arbitrary pupil size is discussed) for convenience of explanation. In this case, the following expression (1) is satisfied in terms of geometry.

$$TL = WD - 2 \times EL \times \tan(\theta/2) \quad (1)$$

For example, when EL=18 mm and $\theta$=15° (practical values), TL=WD−4.7 mm. It is preferable that the value WD be as small as possible from the viewpoint of preventing a situation in which the field of view is blocked by the eyepiece window 142. If WD<9.7 mm (i.e., TL<5 mm), it may be difficult (severe) to perform a positional adjustment (i.e., an adjustment that causes the eyepiece optical axis to coincide with the line of sight) on the eyepiece window 142.

Examples of such an optical system include a pupil-division see-through optical system (see JP-A-2006-3879). The pupil-division see-through optical system is designed so that the exit pupil of the optical system is set at a point around the eyepiece (eyepiece window 142) such that the size of the eyepiece can be reduced. Since the size of the eyepiece is small, light enters the pupil from the external field of view through the outside of the eyepiece. This makes it possible to implement see-through display. When using the pupil-division see-through optical system, the width of the end (where the eyepiece window 142 is provided) of the display 140 is 4 mm or less ($\theta$<15° or EL<18 mm), for example.

Figure 9:
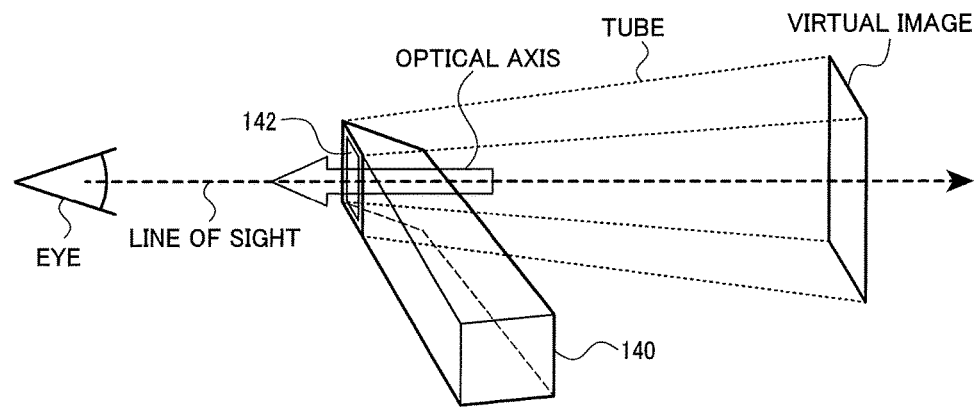
FIG. 9 is a schematic view illustrating the way in which a virtual image is viewed through an eyepiece window.
Figure 10A:
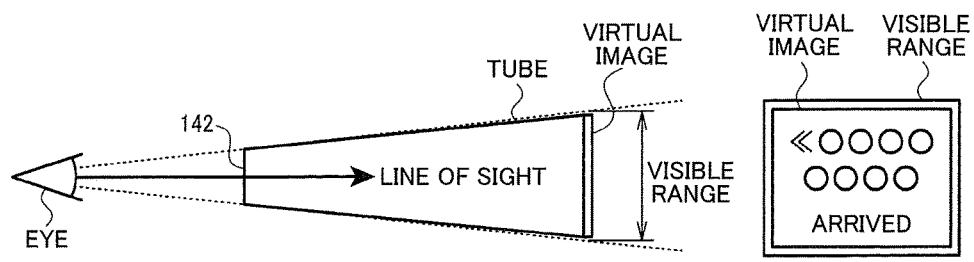
FIGS. 10A and 10B are schematic views illustrating the way in which a virtual image is viewed through an eyepiece window.
Figure 10B:
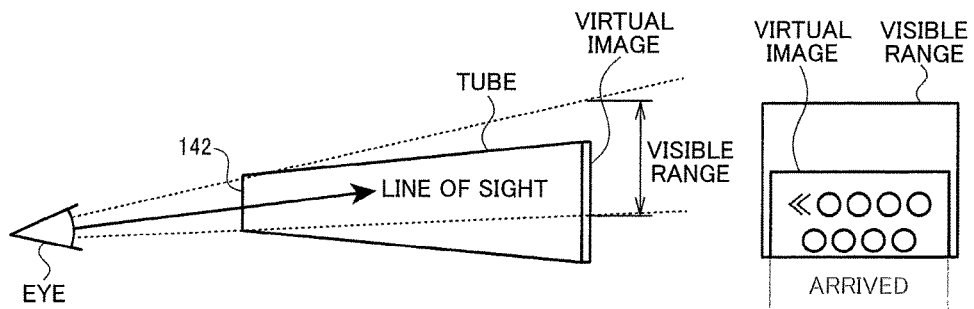

FIGS. 9 to 10B schematically illustrate the virtual image observed through the eyepiece window 142 when the optical system described above is used.

As illustrated in FIG. 9, the virtual image projected through the optical system of the display 140 is observed as if the virtual image were situated on the front side of the eyepiece window 142 with respect to the eye. Specifically, the virtual image is observed through the eyepiece window 142 (i.e., the virtual image is observed through a virtual tube (hereinafter referred to as "tube") that connects the eyepiece window 142 and the virtual image).

As illustrated in FIG. 10A, when the line of sight (visual axis) and the eyepiece optical axis approximately coincide with each other, and the wearer directly looks into the tube, the entire virtual image is observed to be situated within the eyepiece window 142, and the entire display image can be observed through the eyepiece window 142. As illustrated in FIG. 10B, when the line of sight and the eyepiece optical axis do not coincide with each other, and the wearer obliquely looks into the tube, the virtual image is observed to be shifted with respect to the eyepiece window 142 (i.e., only part of the virtual image is situated within the eyepiece window 142), and only part of the display image can be observed (or the entire display image cannot be observed).

Since the pupil-division see-through optical system and the like display an image within part of the field of view (e.g., within a field of view (viewing angle) of 10 to 15°), it is possible to display the image in the peripheral area of the field of view instead of the center of the field of view. Specifically, the wearer can read the display image by optionally observing the eyepiece window 142 situated in the peripheral area of the field of view while maintaining clear sight at the center of the field of view. When an optical system that allows the wearer to arbitrarily change the display position is used, it is considered that the wearer positions the eyepiece window 142 (display position) when the wearer has worn the head-mounted display, or changes the position of the eyepiece window 142 (display position) during use, for example. In this case, it is necessary to perform an adjustment so that the entire image can be observed.

For example, when the wearer desires to display the image on the upper side with respect to the center of the field of view, the wearer positions the eyepiece window 142 on the upper side with respect to the center of the eye (see FIG. 10B). If the entire display image cannot be observed, it is necessary to perform an adjustment (correction) so that the entire display image can be observed. In this case, it is highly convenient if an adjustment can be performed while maintaining the position of the eyepiece window 142 as much as possible (i.e., without changing the display position). When an adjustment has been performed so that the entire display image can be observed (see FIG. 10A), it is desirable that a further adjustment be unnecessary (i.e., the entire display image can be observed without performing an adjustment) even if the display position has been changed.

The wearable device 100 according to one embodiment of the invention that is provided with the first rotation axis 10 and the second rotation axis 20 can solve the above problem as described below.

Figure 11:
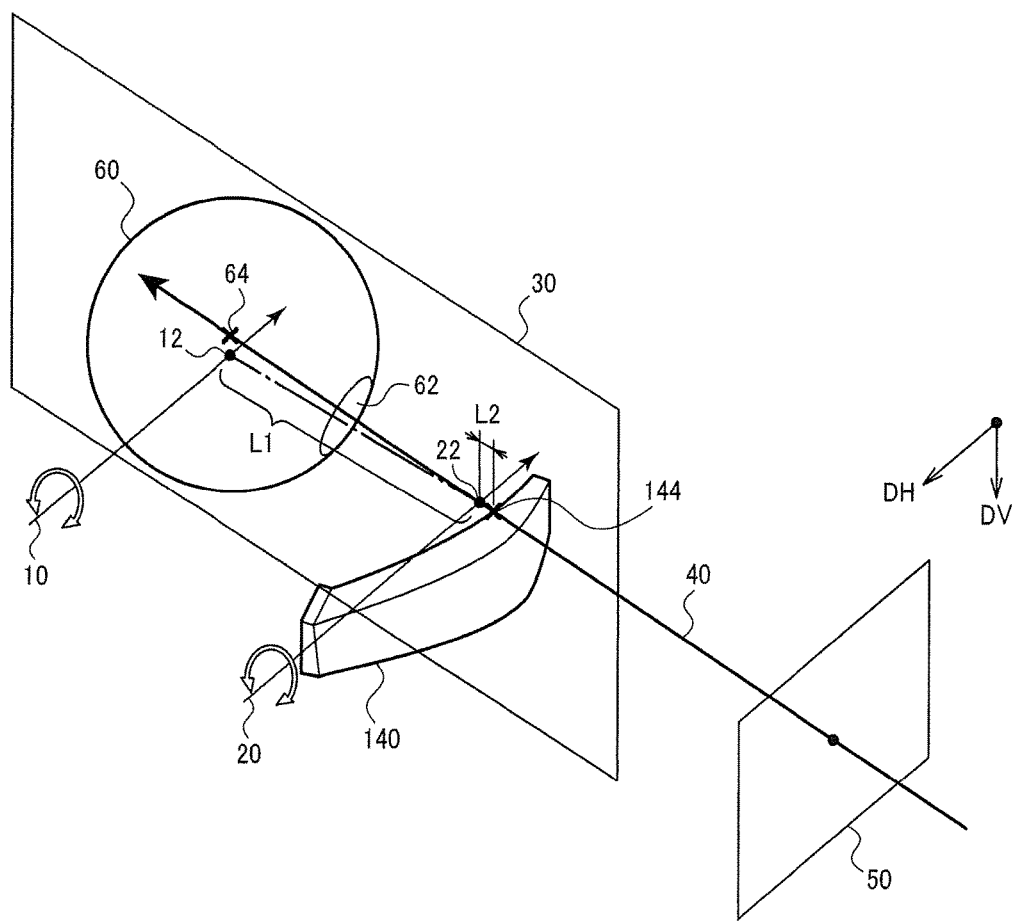
FIG. 11 is a schematic view illustrating the positions of a first rotation axis, a second rotation axis, an eyeball, and a display when a wearer wears a wearable device.

FIG. 11 schematically illustrates the positions of the first rotation axis 10, the second rotation axis 20, the eyeball 60, and the display 140 when the wearer wears the wearable device 100.

A virtual plane 30 is a (virtual) plane that includes the eyepiece optical axis 40 of the display 140, and intersects the first rotation axis 10 and the second rotation axis 20. A first intersection 12 is the intersection of the virtual plane 30 and the first rotation axis 10. A second intersection 22 is the intersection of the virtual plane 30 and the second rotation axis 20. A distance L1 is the distance from the first intersection 12 to the second intersection 22, and a distance L2 is the distance from the second intersection 22 to an exit end 144 of the eyepiece optical axis 40 (an intersection of an eyepiece and the eyepiece optical axis 40).

The eyepiece optical axis 40 is the optical axis of the eyepiece-side end (eyepiece window 142) of the display 140. Since the display 140 is configured so that the light (image) is reflected (or refracted) within the optical system in order to guide the light (image) to the eyepiece window 142, the direction of the optical axis changes each time reflection (or refraction) occurs. The eyepiece optical axis 40 is the optical axis of the part that emits light toward the eye. The exit end of the eyepiece optical axis 40 corresponds to the intersection of the part of the optics that emits light toward the eye, and the eyepiece optical axis 40. For example, when an eyepiece lens is provided to the eyepiece window 142, and the eyepiece lens is the final optical element, the exit end is the intersection of the eyepiece lens and the eyepiece optical axis 40. When a prism or a mirror is provided on the inner side of the eyepiece window 142, and the prism or mirror is the final optical element, the exit end is the intersection of the prism or mirror and the eyepiece optical axis 40.

The distance L1 and the distance L2 defined as described above satisfy the relationship "20 mm≤L1+L2≤45 mm". Note that the distance L1 and the distance L2 desirably satisfy the relationship "30 mm≤L1+L2≤35 mm".

It is considered in terms of ergonomics that the radius of the eyeball 60 is about 12 mm, the distance from the pupil of the eyeball 60 to the eyeglass lens is about 12 mm, and the dimension of the space required to prevent a situation in which the display 140 comes in contact with the eyeglass lens when the display 140 is rotated around the first rotation axis 10 is about 6 mm. Since the sum of the radius of the eyeball 60, the distance from the pupil of the eyeball 60 to the eyeglass lens, and the dimension of the space is about 30 mm, the first rotation axis 10 passes through a point around an eyeball center 64 when the value "L1+L2" is set to about 30 mm. Note that these values are average values determined in terms of ergonomics, and may vary due to individual variations, the shape of the wearable element, and the like. Specifically, various design values are ergonomically determined so that the first rotation axis 10 passes through a point around the eyeball center 64 when designing the wearable device.

The distance L1 and the distance L2 may be set so that the relationship "about 20 mm≤L1+L2≤about 45 mm" is satisfied, for example. The lower limit (20 mm) is set taking account of the case where an eyeglass lens is not provided (e.g., neck band 170), and the upper limit (45 mm) is set taking account of practical utility and the like.

More specifically, the lower limit (20 mm) is calculated by adding up the radius (about 12 mm) of the eyeball 60 and the dimension (about 8 mm) of the space required to prevent a situation in which the display 140 comes in contact with the eyelashes. The upper limit (45 mm) is set taking account of the limit by which the entire virtual image can be observed through the eyepiece window 142 in addition to the fact that the value "L1+L2" increases due to a usage state in which protective glasses are worn over the eyeglasses, racial differences in the distance from the eyeball center to the eyeglass lens, and the like. For example, when the width of the eyepiece window 142 is set to 4 mm, and the value "L1+L2" is set to 45 mm, the viewing angle with respect to the widthwise direction of the eyepiece window 142 is about 5.1°. Since the field of view of the pupil-division see-through optical system in the widthwise direction (i.e., vertical field of view) is typically about 5 to 9°, it is difficult to observe the entire image through the center of the pupil when the value "L1+L2" is larger than 45 mm (even if an adjustment is made). Moreover, the size of the eye-box (i.e., a range in which the entire image can be observed even if the position of the eye has changed) significantly decreases, and it becomes necessary to make a difficult (severe) adjustment with regard to the visual axis and the eyepiece optical axis. Therefore, it is practically difficult to set the value "L1+L2" to be larger than 45 mm. The upper limit (45 mm) is set also taking account of a situation in which the support strength decreases or operation is hindered if the display 140 is significantly situated away from the eyeglasses, and the display swings to a large extent along with the motion of the head due to an increase in moment, for example. Note that each of the above values varies depending on individual variations and the like, and the lower limit (20 mm) and the upper limit (45 mm) may be changed to some extent.

In any case, when the first rotation axis 10 and the second rotation axis 20 are provided so that the relationship "20 mm≤L1+L2≤45 mm" is satisfied, it is possible to implement a state in which the first rotation axis 10 passes through a point around the eyeball center 64. When the first rotation axis 10 and the second rotation axis 20 are provided in such a manner, it is possible to easily adjust the angle of the eyepiece optical axis 40 (i.e., make an adjustment that causes the line of sight and the eyepiece optical axis 40 to approximately coincide with each other when the pupil 62 (line of sight) has been turned on the virtual image 50). When the first rotation axis 10 passes through a point around the eyeball center 64, the display image can be observed even if the display position has been changed after an adjustment has been made so that the display image can be observed.

Figure 12:
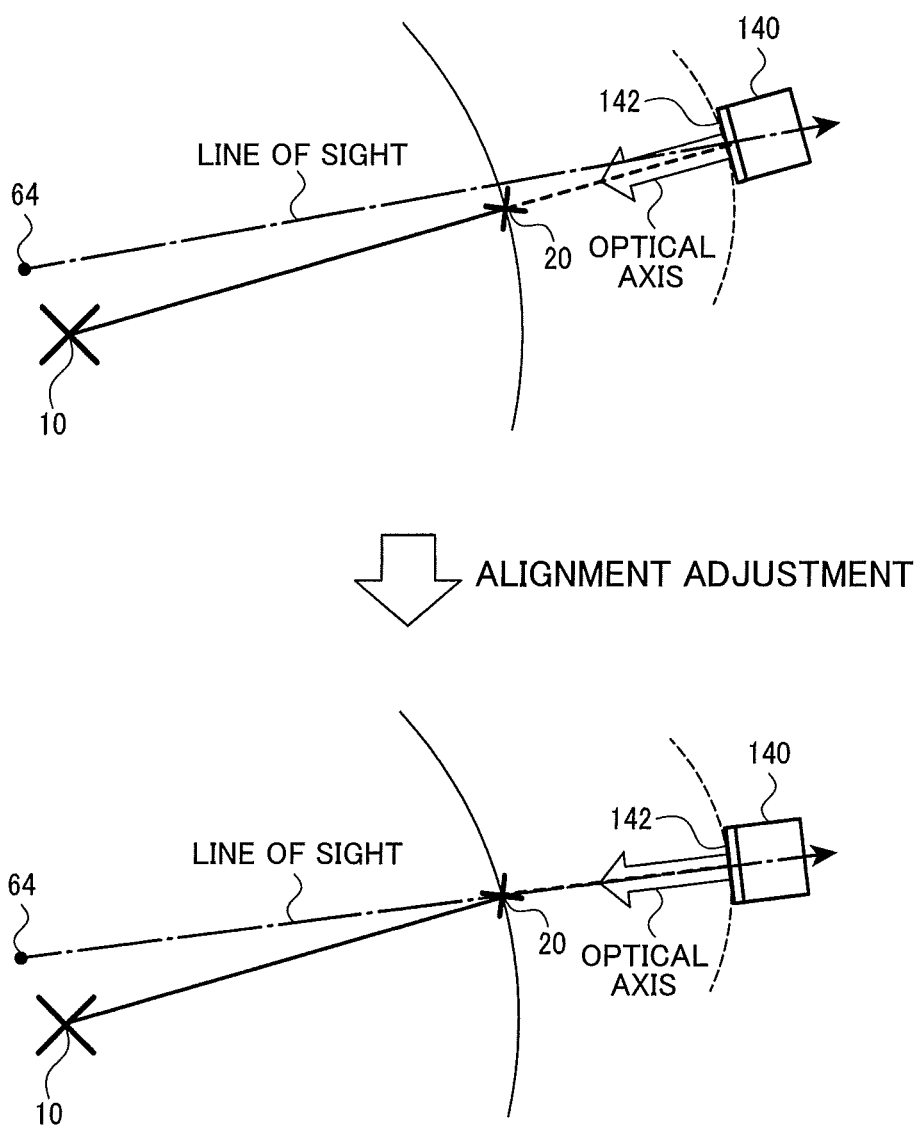
FIG. 12 is a view illustrating a display positional adjustment and an alignment adjustment.

Specifically, the wearer (user) adjusts the display position to the desired position by rotating the display 140 around the first rotation axis 10 (see the upper part of FIG. 12). The wearer then rotates the display 140 around the second rotation axis 20 so that the line of sight and the eyepiece optical axis (approximately) coincide with each other such that the entire display image can be observed (alignment adjustment) (see the lower part of FIG. 12). Specifically, it is possible to sequentially perform the positional adjustment and the alignment adjustment (i.e., adjustment of the optical axis direction) by a simple operation as a result of providing the first rotation axis 10 and the second rotation axis 20.

Figure 13:
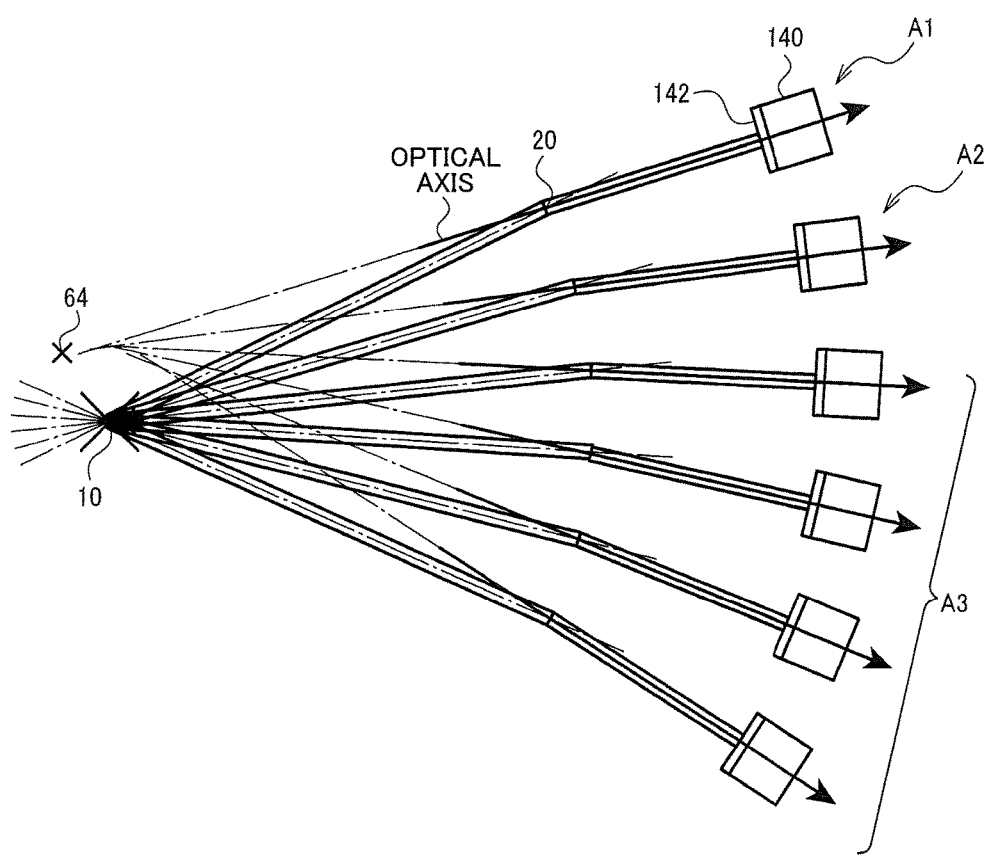
FIG. 13 is a view illustrating the movement of a display position after an alignment adjustment.

FIG. 13 illustrates a state after the above adjustment has been performed (see A2). As illustrated in FIG. 13, the optical axis passes through the eyeball center, and the optical axis and the line of sight coincide with each other. The display 140 is rotated around the first rotation axis 10 when it is desired to move the display position upward (see A1) or downward (see A3). In this case, since the first rotation axis 10 passes through a point around the eyeball center, the optical axis approximately passes through the eyeball center (i.e., the line of sight and the optical axis are shifted from each other to only a small extent) even when the display 140 is rotated around the first rotation axis 10. Therefore, the entire display image can be observed even if the display position is changed after the display position has been determined, and the alignment adjustment has been performed. Even if part of the display image cannot be observed, it is possible to easily perform the alignment adjustment again since it suffices to perform a minor adjustment.

As described above, since the first rotation axis 10 and the second rotation axis 20 are provided at the ergonomically optimum positions, it is possible to place the eyepiece element in an optimum area by performing the first-step operation (see the upper part of FIG. 12). In this case, when the optical axis of the eyepiece element and the line of sight of the user (approximately) coincide with each other, it is possible to immediately observe the display image through the eyepiece element without making an adjustment. Even when the optical axis of the eyepiece element and the line of sight of the user do not (approximately) coincide with each other (i.e., part of the display image cannot be observed), it is possible to immediately (easily) cause the optical axis of the eyepiece element and the line of sight of the user to coincide with each other by performing the second-step operation (see the lower part of FIG. 12) (alignment adjustment).

In one embodiment of the invention, it is preferable that the distance L1 and the distance L2 satisfy the relationship "L1≥5×L2". Specifically, the ratio "L1/L2" of the distance L1 to the distance L2 is larger than 5. It is ideal that the distance L2 be 0 mm (L2=0 mm).

It is possible to reduce a change in display position due to the alignment adjustment by providing the first rotation axis 10 and the second rotation axis 20 so that the relationship "L1≥5×L2" is satisfied. Specifically, when performing the two-step adjustments described above with reference to FIG. 12, it is possible to implement the alignment adjustment while preventing a situation in which the display position determined by the first step is changed to a large extent. If the display position has been changed due to the alignment adjustment, it is necessary to finely adjust the display position again. According to one embodiment of the invention, it suffices to perform only the two-step adjustments.

In one embodiment of the invention, the distance L2 is set to be equal to or less than 5 mm (L2≤5 mm).

The condition "L2=5 mm" is obtained by applying a typical value "L1+L2=30 mm" to L1=5×L2 (P=5). Specifically, when the distance L2 is set to be equal to or less than 5 mm (L2≤5 mm), it is possible to reduce a change in display position due to the alignment adjustment, and implement the two-step adjustments (i.e., adjustment of display position and alignment adjustment).

According to one embodiment of the invention, the virtual plane 30 that includes the eyepiece optical axis 40 and the first rotation axis 10 are (approximately) orthogonal to each other, and the virtual plane 30 and the second rotation axis 20 are (approximately) orthogonal to each other (see FIG. 11, for example). Note that the virtual plane 30 need not necessarily be perfectly orthogonal to the first rotation axis 10 and the second rotation axis 20. For example, it suffices that the virtual plane 30 form an angle of 80 to 90° with the first rotation axis 10 and the second rotation axis 20. Even when the virtual plane 30 is designed to be orthogonal to the first rotation axis 10 and the second rotation axis 20, individual variations due to tolerance and the like are acceptable.

When the virtual plane 30 is orthogonal to both the first rotation axis 10 and the second rotation axis 20, the first rotation axis 10 and the second rotation axis 20 are orthogonal to the eyepiece optical axis 40, and are parallel to each other.

When the first rotation axis 10 is tilted with respect to the eyepiece optical axis 40, a component of rotation around the axis orthogonal to the eyepiece optical axis 40 and a component of rotation around the eyepiece optical axis 40 are mixed when the display 140 is rotated around the first rotation axis 10. Therefore, the display image is rotated around the eyepiece optical axis 40 due to the component of rotation around the eyepiece optical axis 40, and it is necessary to provide a further adjustment mechanism that corrects the rotation of the display image. This also applies to the case where the second rotation axis 20 is tilted with respect to the eyepiece optical axis 40. According to one embodiment of the invention, since the first rotation axis 10 and the second rotation axis 20 are (approximately) orthogonal to the eyepiece optical axis 40, the rotation of the display image around the eyepiece optical axis 40 rarely occurs when an adjustment around the first rotation axis 10 or the second rotation axis 20 is performed.

When the first rotation axis 10 does not exactly pass through the eyeball center 64, the eyepiece optical axis 40 is shifted from the eyeball center 64 when the display 140 is rotated around the first rotation axis 10. In this case, a shift of the eyepiece optical axis 40 from the eyeball center 64 occurs in a plane that passes through the eyepiece optical axis 40 and is orthogonal to the first rotation axis 10. Likewise, when the direction of the eyepiece optical axis 40 is adjusted around the second rotation axis 20, the movement of the eyepiece optical axis 40 occurs in a plane that passes through the eyepiece optical axis 40 and is orthogonal to the second rotation axis 20. According to one embodiment of the invention, since the first rotation axis 10 and the second rotation axis 20 are parallel to each other, the movement of the eyepiece optical axis 40 occurs in an identical plane (virtual plane 30), and the direction of the eyepiece optical axis 40 that has been shifted due to the movement of the display position around the first rotation axis 10 can be adjusted around the second rotation axis 20 (i.e., alignment adjustment).

According to one embodiment of the invention, the virtual plane 30 is parallel to the vertical scan direction DV of the image that is displayed as the virtual image 50 (see FIG. 11, for example).

The display device is configured to repeat an operation that sequentially selects the pixels along the scan line, and writes the pixel value into the selected pixels to display an image that corresponds to one screen. The direction that extends along the scan line is referred to as "horizontal scan direction", and the direction that is orthogonal to the horizontal scan direction is referred to as "vertical scan direction". The horizontal scan direction DH and the vertical scan direction DV illustrated in FIG. 11 are directions with respect to the virtual image that correspond to the directions defined with respect to the screen of the display device.

The vertical scan direction DV normally approximately coincides with the upward-downward direction of the field of view of the wearer. Since the virtual plane 30 is parallel to the vertical scan direction DV, the first rotation axis 10 that is orthogonal to the virtual plane approximately coincides with the rightward-leftward direction of the field of view. In this case, when the first rotation axis 10 of the eyeglass-type frame 150 illustrated in FIG. 1, a neck band, or the like is provided around the temple of the wearer, the first rotation axis 10 passes through a point around the eyeball center 64. In this case, the first rotation axis 10 (i.e., the connection point of the wearable element and the connector 130) is situated to coincide with the temple of the eyeglass-type frame 150 or an ear piece of a neck band (i.e., the connector 130 is attached to the wearable element at a natural position).

According to one embodiment of the invention, it suffices that the first rotation axis 10 pass through the eyeball 60 of the wearer when the wearable element is worn on the head 70.

Although an example in which the first rotation axis 10 passes through a point around the eyeball center 64 as a result of providing the first rotation axis 10 and the second rotation axis 20 so that the relationship "L1+L2=30 mm" is satisfied has been described above with reference to FIG. 11 and the like, it suffices that the first rotation axis 10 pass through the eyeball 60 in order to implement the adjustment of the display position and the alignment adjustment. It is desirable that the first rotation axis 10 pass through a point within 6 mm (i.e., half of the radius of the eyeball 60) from the eyeball center 64. Note that the eyeball center 64 refers to the center of a sphere when the eyeball 60 is considered to be a sphere.

Since the position of the eyeball 60, the positional relationship between the eyeball 60 and the ear 80 or the nose, the radius of the eyeball 60, and the like differ between individuals, the positional relationship between the first rotation axis 10 and the eyeball 60 also differs between individuals when an identical wearable device 100 is used. Therefore, it suffices that the wearable device 100 be designed so that the first rotation axis 10 passes through the eyeball 60 of 90% of the wearers, for example.

Figure 14A:
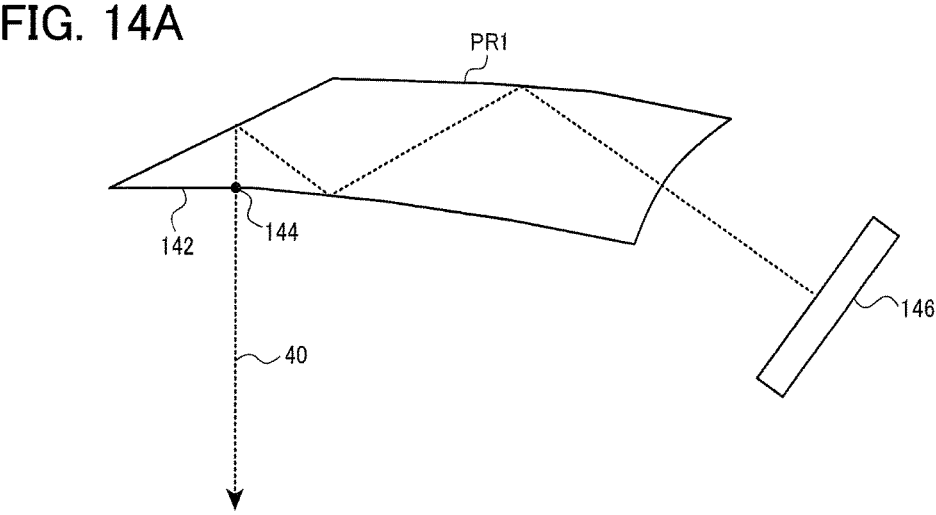
FIG. 14A illustrates a first configuration example of an optical system of a display.
Figure 14B:
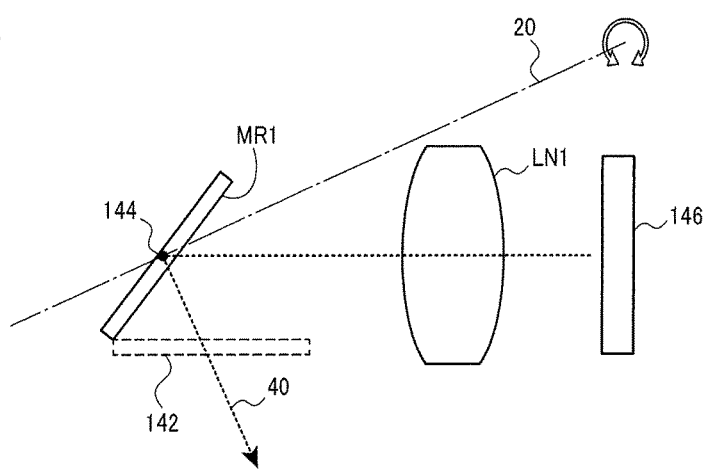
FIG. 14B illustrates a second configuration example of an optical system of a display.
Figure 14C:
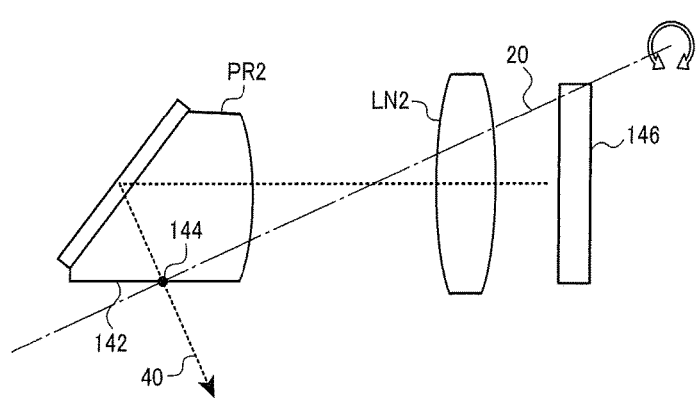
FIG. 14C illustrates a third configuration example of an optical system of a display.

First to third configuration examples of the optical system of the display 140 are described below as examples of an optical system that requires a difficult (severe) positional adjustment. FIG. 14A illustrates a first configuration example of the optical system of the display 140, FIG. 14B illustrates a second configuration example of the optical system of the display 140, and FIG. 14C illustrates a third configuration example of the optical system of the display 140.

The optical system according to the first configuration example includes a display panel 146 and a prism PR1. The prism PR1 guides light from the display panel 146 to the eyepiece window 142 while reflecting the light within the prism PR1 a plurality of times. The prism PR1 has a positive diopter (power or refractive power) due to the incident end face and the shape of the reflection plane to project the virtual image onto the eye. According to the first configuration example, the end face of the prism PR1 through which light exits from the optical system corresponds to the eyepiece window 142, and the intersection of the end face and the eyepiece optical axis 40 (exit optical axis) corresponds to the exit end 144 of the eyepiece optical axis 40. The optical system according to the first configuration example is configured so that the optical axis of the display panel 146 and the eyepiece optical axis 40 form an acute angle, and the light is guided by the prism PR1, and the display 140 has a shape along the curved surface of the eyeglass frame.

The optical system according to the second configuration example includes a display panel 146, a lens LN1, and a mirror MR1. Light from the display panel 146 passes through the lens LN1 that has a positive diopter, is reflected by the mirror MR1, and exits from the optical system through the eyepiece window 142. According to the second configuration example, the opening of the housing through which the light reflected by the mirror MR1 exits from the optical system corresponds to the eyepiece window 142. The intersection of the reflection plane of the mirror MR1 and the eyepiece optical axis 40 corresponds to the exit end 144 of the eyepiece optical axis 40. The optical system according to the second configuration example is configured so that the mirror MR1 reflects the light (bends the optical axis) at an acute angle, and the display 140 is formed to follow the curved surface of the eyeglass frame as much as possible.

The optical system according to the third configuration example includes a display panel 146, a lens LN2, and a prism PR2. Light from the display panel 146 passes through the lens LN2, enters the prism PR2, is reflected by the reflection plane of the prism PR2, and exits from the optical system through the end face of the prism PR2. The optical system has a positive diopter due to the shape of the incidence plane of the prism PR2 and the lens LN2. According to the third configuration example, the end face of the prism PR2 through which the light exits from the optical system corresponds to the eyepiece window 142, and the intersection of the end face and the eyepiece optical axis 40 corresponds to the exit end 144 of the eyepiece optical axis 40. The optical system according to the third configuration example is configured so that the prism PR2 reflects the light (bends the optical axis) at an acute angle, and the display 140 is formed to follow the curved surface of the eyeglass frame as much as possible.

The embodiments to which the invention is applied and the modifications thereof have been described above. Note that the invention is not limited to the above embodiments and the modifications thereof. Various modifications and variations may be made without departing from the scope of the invention. A plurality of elements described above in connection with the embodiments and the modifications thereof may be appropriately combined to implement various configurations. For example, some of the elements described above in connection with the embodiments and the modifications thereof may be omitted. Some of the elements described above in connection with different embodiments or modifications thereof may be appropriately combined. Specifically, various modifications and applications are possible without materially departing from the novel teachings and advantages of the invention. Any term cited with a different term having a broader meaning or the same meaning at least once in the specification and the drawings can be replaced by the different term in any place in the specification and the drawings.

What is claimed is:

1. A wearable device comprising:
   a wearable element that is worn on a head of a wearer;
   a display that displays a virtual image within part of a field of view of the wearer; and a connector that is connected to the wearable element, and comprises a slide-rotation mechanism that supports the display so as to be slidable with respect to the head and rotatable in a state in which the display has been slid,
wherein the slide-rotation mechanism is provided to the connector so that a slide direction of the display is parallel to a direction that extends along a rotation axis around which the display is rotated; and
the slide-rotation mechanism comprises:
a rod-like slide shaft that is secured on the connector; and
a holder that is secured on the wearable element, and holds the slide shaft so as to be slidable and rotatable.

2. The wearable device as defined in claim 1,
wherein the slide direction of the display is a direction that extends along eyes of the wearer when the wearable element is worn on the head, and
the slide-rotation mechanism is configured so that the wearer can slide the display to a position at which the wearer can observe a display screen of the display with one eye, and then change a position of a display image within the field of view of the wearer by rotating the display, or rotate the display to a position at which an eyepiece optical axis of the display coincides with a line of sight of the wearer.

3. The wearable device as defined in claim 1, wherein the slide-rotation mechanism is configured such that a position of a display image within the field of view of the wearer can be changed by rotating the connector and the slide shaft around a rotation axis, the rotation axis being a given axis of the slide shaft that extends in a longitudinal direction.

4. The wearable device as defined in claim 1,
wherein a relationship "Fs>Fr" is satisfied (where, Fs is a force required when sliding the slide shaft with respect to the holder, and Fr is a force required when rotating the slide shaft with respect to the holder).

5. The wearable device as defined in claim 1,
wherein the slide shaft comprises a cylindrical member of which a cylinder axis extends parallel to the slide direction, and
the holder is an elastic member having a cylindrical hole into which the cylindrical member is inserted.

6. The wearable device as defined in claim 5,
wherein a protrusion is formed on a curved surface of the cylindrical member,
a plurality of grooves are formed in a curved surface of the cylindrical hole, each of the plurality of grooves being formed along a circumferential direction,
the slide shaft is slid with respect to the holder while the protrusion that has engaged with one groove among the plurality of grooves engages with a groove among the plurality of grooves that differs from the one groove, and
the slide shaft is rotated with respect to the holder while the protrusion that has engaged with the groove when the slide shaft was slid with respect to the holder is rotated along the groove.

7. The wearable device as defined in claim 1,
wherein the slide shaft is a male screw member of which a rotation axis extends parallel to the slide direction,
the holder is a female screw member that corresponds to the male screw member, and
the slide shaft can be rotated and slid with respect to the holder by turning the male screw member or the female screw member.

8. A wearable device comprising:
a wearable element that is worn on a head of a wearer;
a display that displays a virtual image within part of a field of view of the wearer; and
a connector that is connected to the wearable element, and comprises a slide-rotation mechanism that supports the display so as to be slidable with respect to the head and rotatable in a state in which the display has been slid,
wherein the slide-rotation mechanism is provided to the connector so that a slide direction of the display is parallel to a direction that extends along a rotation axis around which the display is rotated; and
the slide-rotation mechanism comprises:
a rod-like slide shaft that is secured on the display; and
a holder that is secured on the connector, and holds the slide shaft so as to be slidable and rotatable.

9. The wearable device as defined in claim 8, wherein the slide-rotation mechanism is configured such that an eyepiece optical axis of the display can be caused to coincide with a line of sight of the wearer by rotating the display and the slide shaft around a rotation axis, the rotation axis being a given axis of the slide shaft that extends in a longitudinal direction.

10. A wearable device comprising:
a wearable element that is worn on a head of a wearer;
a display that displays a virtual image within part of a field of view of the wearer; and
a connector that is connected to the wearable element, and comprises a slide-rotation mechanism that supports the display so as to be slidable with respect to the head and rotatable in a state in which the display has been slid,
wherein the slide-rotation mechanism is provided to the connector so that a slide direction of the display is parallel to a direction that extends along a rotation axis around which the display is rotated; and
the slide-rotation mechanism comprises:
a rod-like slide shaft that is secured on the connector;
a shaft holder that holds the slide shaft so as to be slidable; and
a rotation holder that is provided to the wearable element, and holds the shaft holder so as to be rotatable.

11. The wearable device as defined in claim 10,
wherein the slide shaft engages with the shaft holder so as to be slidable in a longitudinal direction of the slide shaft and non-rotatable, and
the shaft holder engages with the rotation holder so as to be rotatable and non-slidable.

12. The wearable device as defined in claim 10,
wherein a relationship "Fs>Fr" is satisfied (where, Fs is a force required when sliding the slide shaft with respect to the shaft holder, and Fr is a force required when rotating the shaft holder with respect to the rotation holder).

13. The wearable device as defined in claim 10,
wherein the slide shaft is a columnar member of which a longitudinal direction is parallel to the slide direction,
the shaft holder is a circular member having a hole into which the columnar member is inserted, and
the rotation holder is a member having a circular hole with which the circular member engages.

14. The wearable device as defined in claim 13,
wherein a plurality of protrusions that are arranged along the slide direction are formed on a side surface of the columnar member,
a groove is formed in an inner surface of the hole of the shaft holder, a groove is formed in an inner surface of the circular hole along a circumferential direction, the slide shaft is slid with respect to the shaft holder while one protrusion among the plurality of protrusions of the columnar member that has engaged with the groove formed in the inner surface of the hole of the shaft holder is removed from the groove, and a protrusion among the plurality of protrusions that differs from the one protrusion engages with the groove, and the shaft holder is rotated with respect to the rotation holder while an outer circumferential surface of the circular member is rotated along the groove formed in the inner surface of the circular hole.

15. A wearable device comprising:

a wearable element that is worn on a head of a wearer;

a display that displays a virtual image within part of a field of view of the wearer; and a connector that is connected to the wearable element, and comprises a slide-rotation mechanism that supports the display so as to be slidable with respect to the head and rotatable in a state in which the display has been slid, wherein the slide-rotation mechanism is provided to the connector so that a slide direction of the display is parallel to a direction that extends along a rotation axis around which the display is rotated; and the slide-rotation mechanism comprises:
- a rod-like slide shaft that is secured on the display;
- a shaft holder that holds the slide shaft so as to be slidable; and
- a rotation holder that is provided to the connector, and holds the shaft holder so as to be rotatable.

\* \* \* \* \*